(No Model.) 4 Sheets—Sheet 2.
C. W. HOLTZER & G. E. CABOT.
ELECTRIC INDICATOR.
No. 466,787. Patented Jan. 12, 1892.
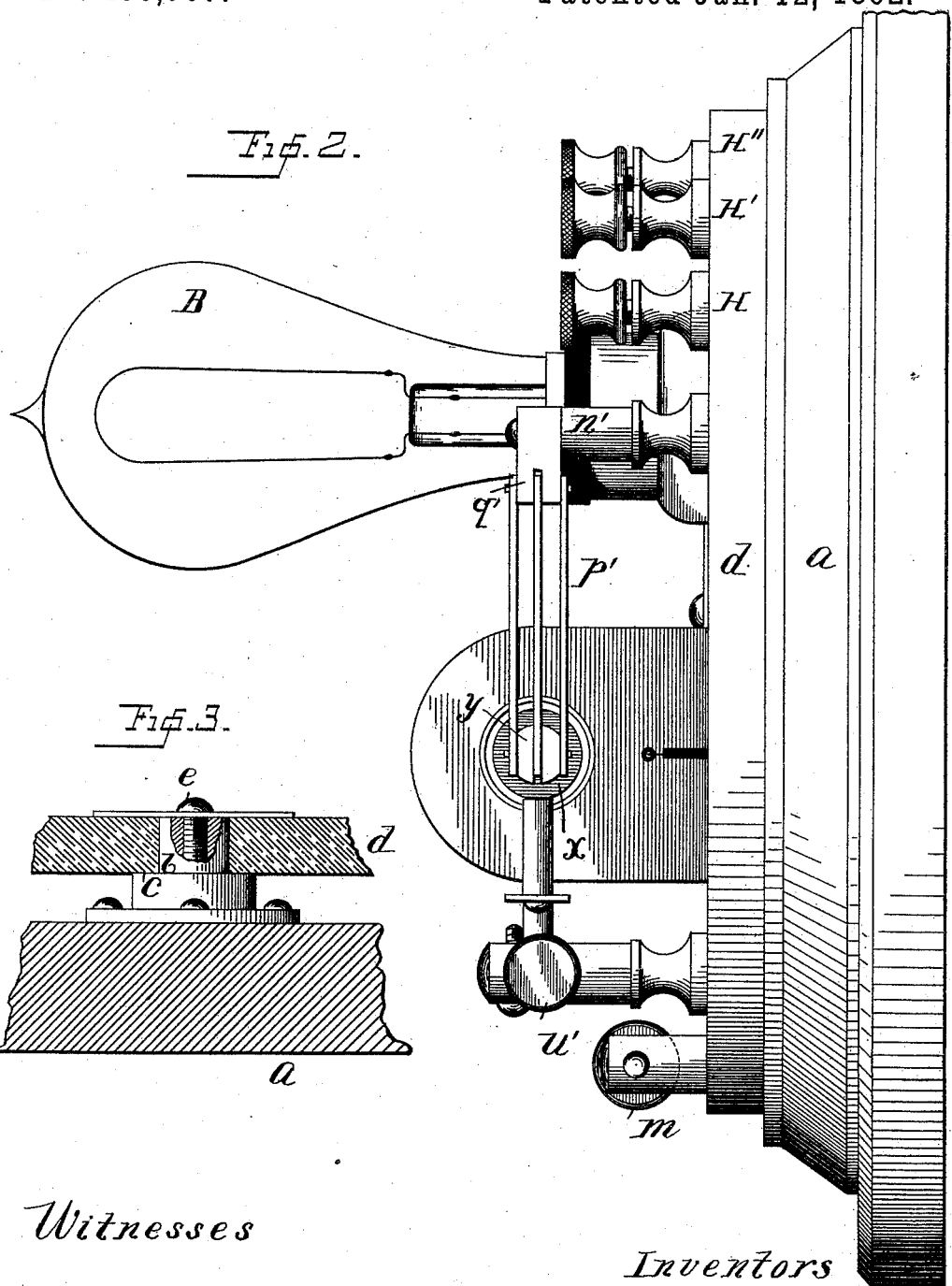
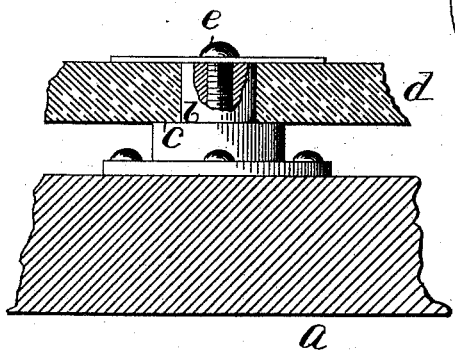
Witnesses
W. A. Courtland
Nellie L. Pope.
Inventors
CHARLES W. HOLTZER
GEORGE E. CABOT
BY THEIR ATTORNEY
Edward P. Thompson
THE NORRIS PETERS CO., PHOTO-LITHO., WASHINGTON, D. C.

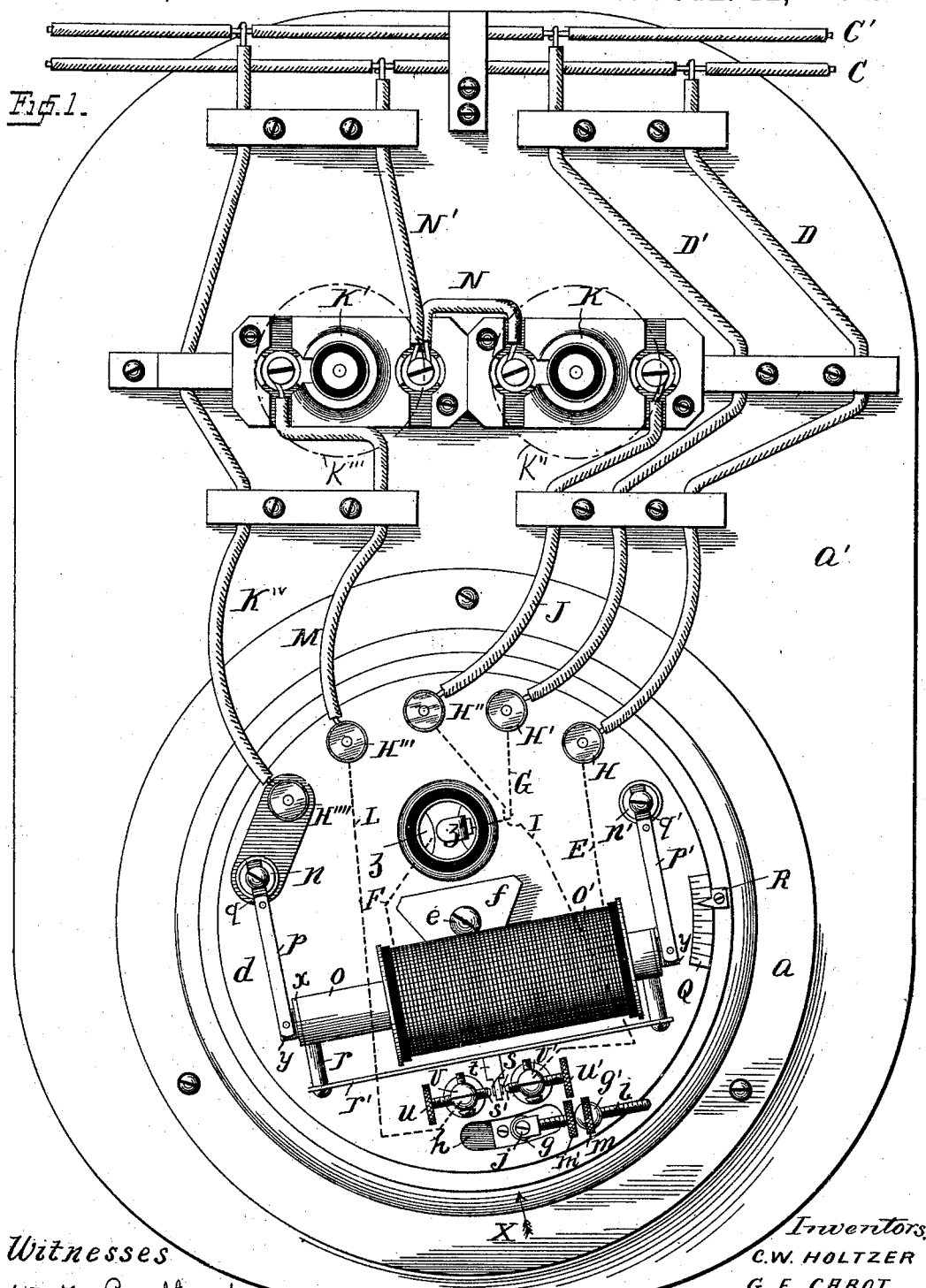

(No Model.) 4 Sheets—Sheet 3.
C. W. HOLTZER & G. E. CABOT.
ELECTRIC INDICATOR.
No. 466,787. Patented Jan. 12, 1892.
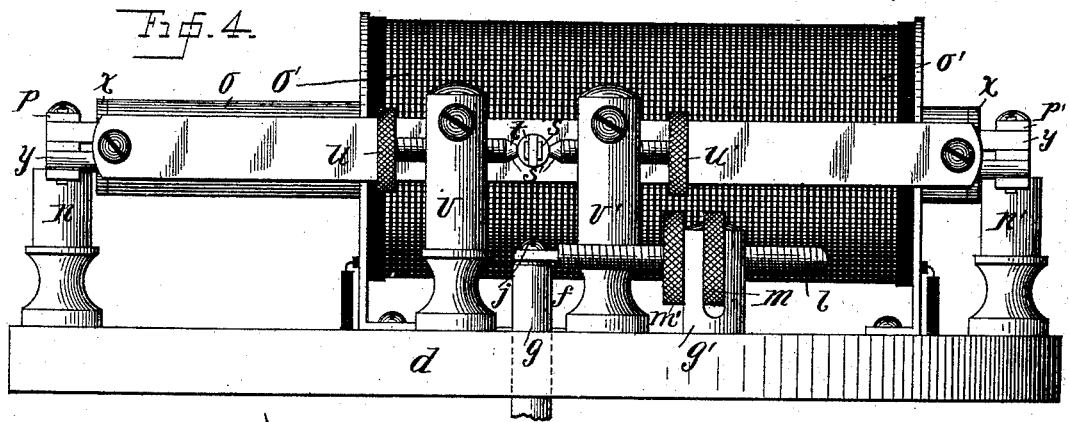
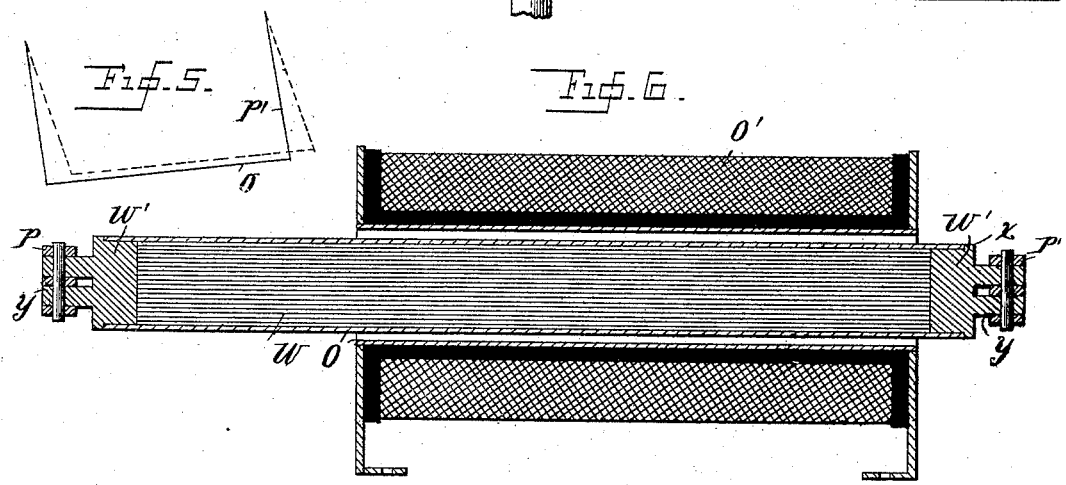
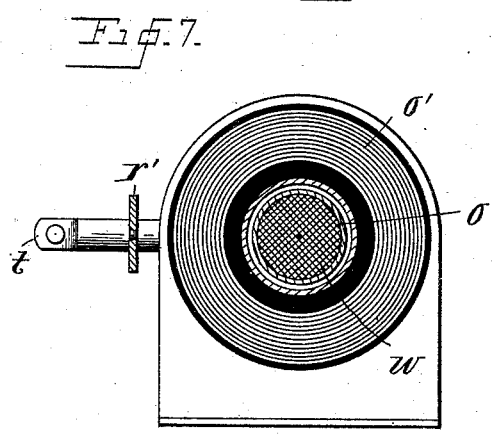
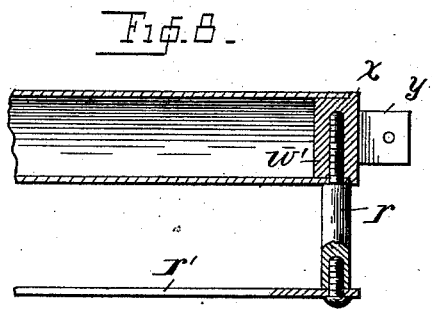
Witnesses
W. H. Courtland
Nellie L. Pope
Inventors
C. W. Holtzer
G. E. Cabot
By their Attorney
Edward P. Thompson (No Model.) 4 Sheets—Sheet 4.
C. W. HOLTZER & G. E. CABOT.
ELECTRIC INDICATOR.
No. 466,787. Patented Jan. 12, 1892.
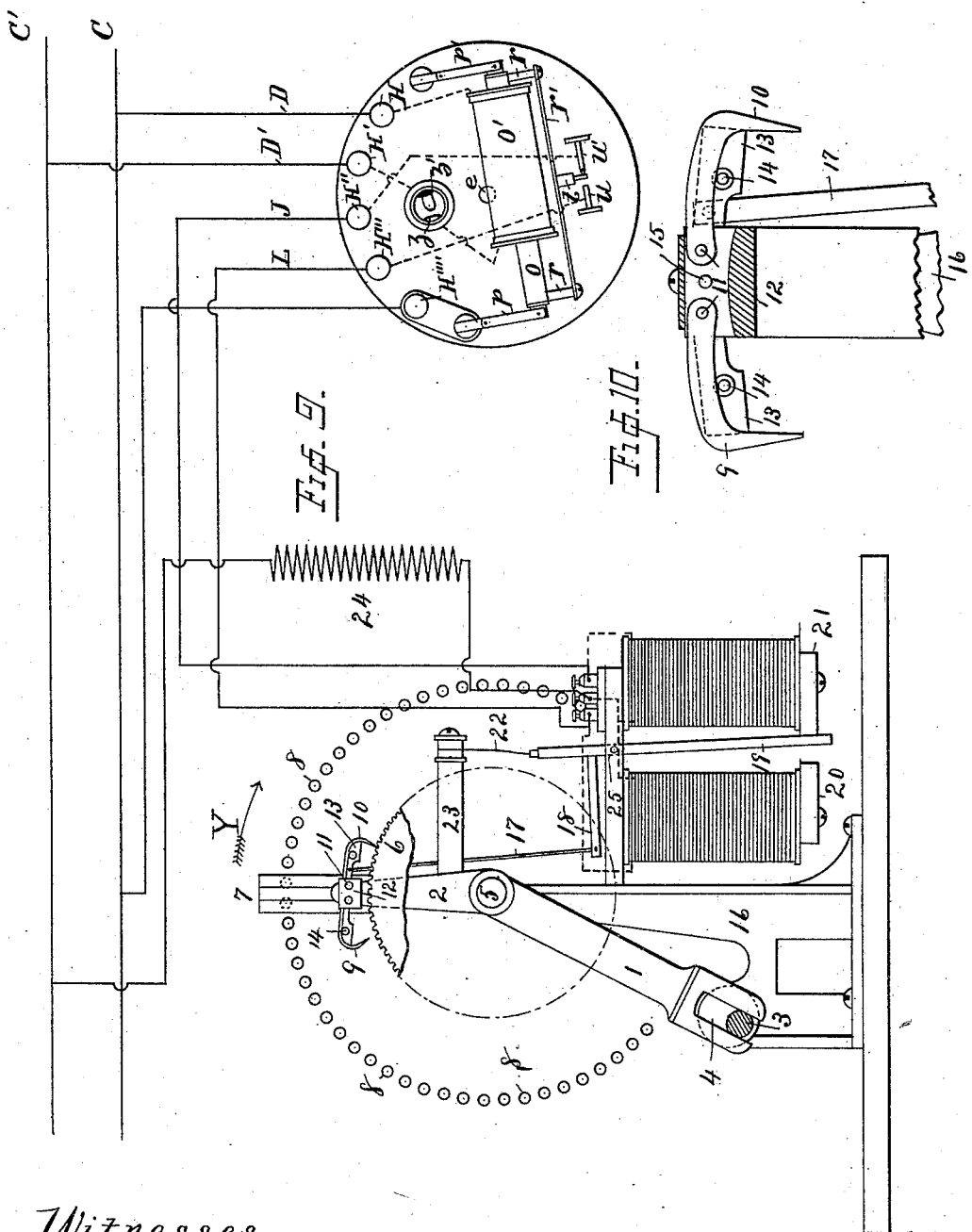
Witnesses
W. H. Courtland
Nellie L. Pope
Inventors
CHARLES W. HOLTZER
GEORGE E. CABOT
BY THEIR ATTORNEY
Edward P. Thompson

UNITED STATES PATENT OFFICE.

CHARLES W. HOLTZER AND GEORGE E. CABOT, OF BROOKLINE, ASSIGNORS TO THE HOLTZER-CABOT ELECTRIC COMPANY, OF BOSTON, MASSACHUSETTS.

ELECTRIC INDICATOR.

SPECIFICATION forming part of Letters Patent No. 466,787, dated January 12, 1892.

Application filed April 6, 1891. Serial No. 387,760. (No model.)

*To all whom it may concern:*

Be it known that we, CHARLES W. HOLTZER and GEORGE E. CABOT, citizens of the United States of America, and residents of Brookline, county of Norfolk, and State of Massachusetts, have invented certain new and useful Improvements in Electric Indicators, (Case 4,) of which the following is a specification.

Our invention relates to a device for indicating variations in the electro-motive force of electric currents. It is applicable especially in central stations for electric light and power installations.

The object of the invention is to provide an instrument delicate in operation and substantial in construction. No tension-springs nor retractile springs are employed, which are objectionable, from the fact that they soon lose their standard elasticity. Experiment shows that the particular indicator herein described will operate the signal on a variation of about one-half of one per cent. It works equally well on one hundred and ten or five hundred volt circuits. In practice the device sometimes operates signal-lamps and sometimes an automatic rheostat-switch.

In general the organization comprises a rotary insulating-plate adjustable in any position within predetermined limits and carrying a solenoid in circuit with the main line through a high resistance, a core for the solenoid suspended in such a manner as to swing so that its axis occupies parallel positions, a beam carried by said core and provided with electric contacts normally balanced between fixed contacts mounted upon said rotary plates, and other details hereinafter described.

Figure 1 is a front elevation of the device mounted upon a board and electrically connected up in circuit. The lamps are omitted, their sockets being shown. The normal position is that in which the board is fixed flat against a vertical wall. Fig. 2 is a side elevation of the principal part of the device, the lamp for resistance being shown applied. Fig. 3 is a section of that portion of the device relating to the means for rotating the base-plate. Fig. 4 is a view of the device looked at in the direction of the arrow X in Fig. 1. Fig. 5 is a diagram illustrating two positions of the solenoid-core. Fig. 6 is a longitudinal section of the solenoid and core. Fig. 7 is a cross-section of the same. Fig. 8 is a section of part of the device, being that part of the core-holder which is attached to the rod $p$ or $p'$. Fig. 9 is a view, partly in diagram, of an application of the device for regulating the current. Some of the parts not necessary are broken away or omitted. Fig. 10 is an enlarged view of a portion not clearly shown in detail in Fig. 9. It is shown partly in section.

The device embodying our invention consists of the combination of a base-plate $a$, the said base having a cylindrical basin formed therein; a journal $b$, attached centrally to the said base within said basin and having a shoulder $c$ at the foot of said journal; a circular insulating-plate $d$, fitting loosely in said basin, resting upon said shoulder, and rotary upon said journal, the said plate $a$ having a central hole in which fits loosely said journal, which has a screw $e$, screwed into itself and through a washer $f$, resting upon the top of said plate $d$; a post $g$, standing upon the base $a$ within the basin at a suitable distance from the center thereof and passing through an arc-shaped slot $h$; a post $g'$, mounted upon the plate $d$ near said slot and provided with a circular hole through which passes a screw $i$, which is pivoted to the upper end of the post $g$ by the screw $j$, the said post $g'$ having a slot in which operates an adjusting-nut $m$, screwed upon said screw $i$, which is provided with a set-nut $m'$, and other important details hereinafter described.

Not diametrically opposite are posts $n$ and $n'$, perpendicular to and mounted upon the plate $d$ in a chord of the circle bounding the plate $d$, said chord being located above the center of the plate $d$. A solenoid core $o$ is suspended from the posts $n$ $n'$ by suspending rods $p$ $p'$, built up of parallel plates, whose ends are pivoted, respectively, to said core and to slotted projections $q$ and $q'$. Surrounding the core $o$ is a solenoid $o'$, whose axis is coincident with or parallel to that of the core. Upon each end of the core $o$ is a post $r$, connected by a rod $r'$, which carries two platinum contacts $s$ upon a projection $t$, which is attached to the rod $r'$. The projection $t$ is between two contact-screws $u$ and $u'$, terminated with platinum $s'$. The axes of the screws $u$ and $u'$ are coincident. The screws $u$ and $u'$ are thumb-screws and are supported in posts $v$ and $v'$, respectively. The core $o$ consists of parallel iron wires $w$, surrounded by a brass tube, in the ends of which fit plugs $w'$, which are provided with holes for receiving the posts $r$, which hold the plugs in the tube. The plug carries a cap $x$, fitting upon the end of the tube and having a projection $y$, to which is pivoted the rod $p$ on one end of the core and the rod $p'$ on the other end.

$z$ and $z'$ are the terminals in an electric-lamp socket A, which holds the lamp B, the latter serving as a resistance to lessen the current passing through the solenoid $o'$.

C C' are the main lines, the former being connected by wire D to the binding-post H, which is connected by wire E to one terminal of the solenoid $o'$. The other terminal is connected by wire F to the terminal $z$ of the socket A. The terminal $z'$ is connected by the wire G to the binding-post H', which is connected by wire D' to the main line C'. The post $v'$, which is electrically connected to the platinum point $s'$, is connected by wire I to the binding-post H'', which is connected by wire J to one terminal of the lamp-socket K. Similarly the platinum point $s'$ is connected by wire L to the binding-post H''', which is connected by wire M to one terminal of the lamp-socket K', the remaining terminals of the two lamps being connected to each other electrically by the wire N and to the main line C by the wire N', while the post H'''' is connected by the wire K'' to the other main line C'.

It is important to notice that the base $a$ is attached to a vertical wall or board $a'$ in such a manner that the axes of the core $o$ and solenoid $o'$ make an acute angle with a level plane, or, which is the same thing, an obtuse angle with a vertical plane.

The solenoid acts as a solenoid or magnet in an ordinary ammeter, so that any variation in the electro-motive force of the main circuit varies the ampère-turns in the core of the solenoid. When the current is passed through the main line and the solenoid $o'$, the screws $m$ and $m'$ are adjusted and the plate $d$ rotated until the strength of the current through magnetic action holds the core $o$ against gravity to such an extent that the platinum points $s$ are out of contact with the points $s'$. The screws $u$ and $u'$ are also adjusted so that the platinum points are at the desired distance from each other. The distance will depend upon the delicacy which it is desired the instrument shall have. The relative locations of the core $o$ and the solenoid $o'$ when there is no current is such that the core projects farther from the lower end of the solenoid than from the upper end. If the current increases from any cause whatever above that normal current which maintains the platinum points separated, then will the platinum point $s'$ on the screw $u'$ come in contact with one of the platinum points $s$, completing the circuit through the lamp $K^{IV}$, which, being of a different color from the lamp K''', will be the means of informing the operator that the electro-motive force is abnormally great. Similarly the lamp K''' may be the means of indicating that the electro-motive force is abnormally low. Assuming that the electro-motive force considered in the above operation is about one hundred and fifty volts, the same device may be made operative upon a circuit carrying a current of four hundred volts by rotating the plate $d$, so that the axes of the core $o$ and solenoid $o'$ shall make a greater angle to a horizontal plane or line.

The lamp-sockets K and K', serving as indicators, may be substituted by the device shown in Fig. 9, which is not described in each detail of mechanical construction, but which is described sufficiently to show its principles of construction and manner of operation in connection with the indicator. The electrical connections between the two devices are clearly represented.

To make the explanation distinct, the parts in the device at the left of Fig. 9 and in Fig. 10 are indicated by numerals. The bent lever has arms 1 and 2, the former being the longer and provided with a slot at its end fitting loosely over a crank-pin 3 on the rotary shaft 4. The fulcrum of the lever is the rotary arbor 5, which is fixed to the ratchet-wheel 6, while the lever is loose upon said shaft. The brush 7, for cutting in and out resistances whose terminals are 8, is also fixed upon the arbor 5, so as to be rotary therewith. The outer or upper end of the lever-arm 2 carries ratchets 9 and 10, pivoted thereto by pivots 11. Upon the standard 12 is a rocking beam 13, carrying stops 14, upon which rest respectively the ratchets 9 and 10. The pivot 15 serves to support the rocking beam 13 upon the standard 16. There is a connecting-rod 17 from the beam 13 to an arm 18, projecting at right angles from the pivoted armature 19, located between the independent magnets 20 and 21. The armature has a retractile spring 22, connected to the standard 23. One of the magnets is connected in circuit with terminals $t$ and $u$ and the other with terminals $t$ and $u'$. In either case the armature 19 is drawn to one side or the other. As shown, the magnet 21 has attracted the armature, whereby the ratchet 10 is allowed to fall between the teeth on the ratchet-wheel 6. As the shaft 4 has continuous rotation, the vibratory motion of the lever-arm 2, and therefore of the ratchet 10, causes the ratchet-wheel 6 to rotate and the brush 7 to move in the direction of the arrow Y intermittently but quite rapidly. If the magnet 20 attracts the armature, the brush will move in the opposite direction. If both magnets are out of circuit, the ratchets 9 and 10 clear the teeth and the brush 7 does not move. The terminals 8 may be connected to resistances as in any rheostat.

24 is a resistance in circuit with the magnets, whereby the magnets may not receive an injurious current.

25 is a pivot for the armature 19.

Q is a scale on the rotary plate $d$, and R is a pointer on the fixed base $a$ for the sake of convenience in seeing at what angle the solenoid axis lies.

We claim as our invention—

1. An electric indicator consisting of the combination of a rotary insulating-plate adjustable angularly to any position within predetermined limits, a solenoid mounted upon said plate eccentrically, a pivotally-suspended core for the solenoid suspended from projections on said plate, a beam or rod carried by said core and provided with electric contacts located between electric contacts projecting from said plate, and means for adjusting the rotary plate angularly, the axes of the core and solenoid being normally at an acute angle to a horizontal line.

2. The combination of a rotary insulating-plate adjustable angularly to any position within predetermined limits, a solenoid mounted upon said plate eccentrically, a pivotally-suspended core for the solenoid suspended from projections on said plate, a beam or rod carried by said core and provided with electric contacts located between electric contacts projecting from said plate, means for adjusting the rotary plate angularly, the axes of the core and solenoid being normally at an acute angle to a horizontal line, an electric generator, main lines in circuit therewith and in circuit with said solenoid, and indicating-lamps in circuit respectively with the adjustable screws which lie in the path of electric contacts projecting from said core.

3. The combination of a base-plate $a$, the said base-plate having a cylindrical basin formed therein, a journal $b$, attached centrally to the base-plate within said basin and having a shoulder $c$, a circular insulating-plate $d$, fitting loosely in said basin, resting against said shoulder and rotary upon said journal, the said plate having a central hole in which fits loosely said journal, which has a screw $e$ screwed into itself and through a washer $f$ resting upon the front of said rotary plate, a post $g$, standing upon the base $a$ within the basin eccentrically and passing through an arc-shaped slot $h$, a post $g'$, mounted upon the plate $d$ and connected to said post $g$ by an adjusting-screw $i$, which is pivoted to the upper end of the post $g$, posts $n$ and $n'$ projecting from said rotary plate, a solenoid core $o$, suspended by its ends by pivoted rods whose upper ends are pivoted to the posts $n\ n'$, a solenoid surrounding said core and mounted upon said rotary plate, and electric contacts carried by said core and located between contacts fixed to said rotary plate and in circuit with independent lamps, the axes of the core and solenoid being normally at an angle to a vertical or horizontal line.

In testimony that we claim the foregoing as our invention we have signed our names, in presence of two witnesses, this 31st day of March, 1891.

CHARLES W. HOLTZER.
GEORGE E. CABOT.

Witnesses:
W. C. VAN DERLIP,
I. HOSLER.